United States Patent [19]

Huang et al.

[11] Patent Number: 5,259,344
[45] Date of Patent: Nov. 9, 1993

[54] INTERMITTENT FUEL-INJECTION METHOD AND DEVICE FOR TWO-STROKE ENGINE

[75] Inventors: Huei-Huay Huang; Ming-Hong Jeng; Nien-Tzu Chang; Tsung-Cheng Wang, all of Hsin chu Hsien, Taiwan

[73] Assignee: Industrial Technology Research Institute, chu Tung Hsin chu Hsien, Taiwan

[21] Appl. No.: 772,079

[22] Filed: Oct. 7, 1991

[51] Int. Cl.$^5$ .......................... F02D 17/02; F02D 3/00
[52] U.S. Cl. ..................................... 123/73 C; 123/481
[58] Field of Search ................. 123/481, 533, 73 A, 123/73 B, 73 C, 198 F, 295, 305

[56] References Cited

U.S. PATENT DOCUMENTS

| | | | |
|---|---|---|---|
| 4,768,474 | 9/1988 | Fujimoto et al. | 123/481 |
| 4,991,558 | 2/1991 | Daly et al. | 123/481 |
| 5,038,739 | 8/1991 | Ishii | 123/481 |
| 5,054,444 | 10/1991 | Morikawa | 123/533 |
| 5,080,060 | 1/1992 | Huang et al. | 123/533 |
| 5,094,217 | 3/1992 | Kaku et al. | 123/533 |
| 5,097,811 | 3/1992 | Baumuller | 123/481 |
| 5,105,792 | 4/1992 | Ichikawa et al. | 123/533 |
| 5,119,792 | 6/1992 | Gu | 123/533 |
| 5,119,793 | 6/1992 | Stoltman | 123/533 |
| 5,123,399 | 6/1992 | Motoyama et al. | 123/533 |

Primary Examiner—David A. Okonsky
Attorney, Agent, or Firm—Dvorak and Traub

[57] ABSTRACT

An intermittent fuel-injection method for two-stroke engine, which is done by means of an injection nozzle mounted under a cylinder head or on cylinder wall so as to have fuel directly injected into a cylinder to mix the air inside the cylinder into a homogeneous mixture; a controller is used for controlling the fuel-injection timing and quantity; the controller determines the injection timing and quantity in accordance with the engine intake air flow quantity and engine rpm; under idle running or low-load running condition, an intermittent fuel-injection control method is used so as to enable an engine to perform one, two, three, four or five scavenging and exhaust cycles after one fuel-injection cycle in order to obtain a steady and high combustion efficiency.

1 Claim, 4 Drawing Sheets

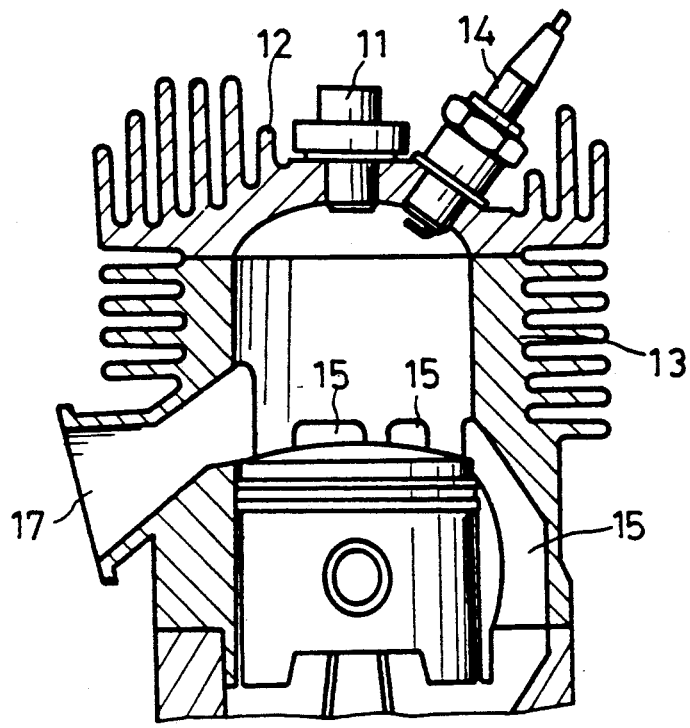
F I G.1-1
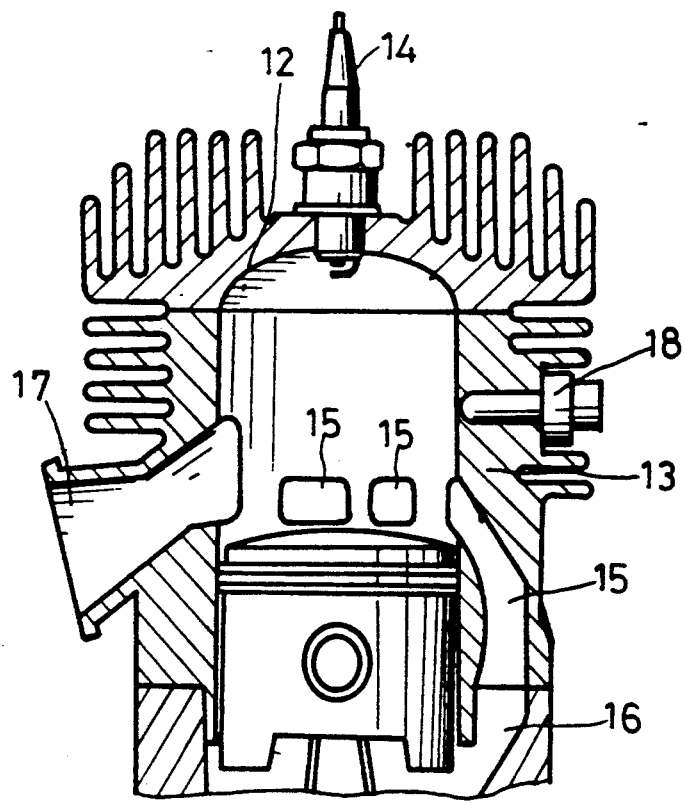
F I G.1-2

INTERMITTENT FUEL-INJECTION METHOD AND DEVICE FOR TWO-STROKE ENGINE

BACKGROUND OF THE INVENTION

Although a two-stroke engine has the advantages of a high ratio of output horsepower/engine weight (volume), it does have two drawbacks as a result of its scavenging cycle, i.e., to scavenge the residual gas left in cylinder by means of fresh air taken in; the two drawbacks are

(11) during scavenging process, part of the fresh mixture is susceptible to flowing to the exhaust port, i.e., a well-know expression of "short-circuiting loss of un-burned mixture"; in a two-stroke engine, the "short-circuiting loss of un-burned mixture" is related to engine load. During low-load operation, there is not much fresh air entered from the scavenging port, and only a small part of fresh mixture flows to the exhaust port. As soon as the engine load is increasing, more fresh mixture will enter the cylinder, and then the short-circuiting loss will be increased correspondingly. As a result, the carburetor of a two-stroke engine would exhaust a large amount of hydrocarbons during a higher load running.

Recently, many improvements on two-stroke engine have been made in order to reduce the short-circuiting loss of un-burned mixture; in such improvements, the most effective method is the "in-cylinder direct injection" to replace the conventional carburetor in order to have the scavenging stream become a solid air flow; further, a control means is used for accurately controlling the fuel-injection timing so as to prevent the un-burned fuel from escaping to the exhaust port.

(2). The fresh air stream is unable to clear the residual gas in the cylinder; and then a high residual gas ratio remains in the cylinder; such phenomenon usually takes place during the low-load running or the idle running of an engine, and simultaneously there is less fresh air to enter the cylinder through scavenging ports; in that case, there will be less short-circuiting loss as mentioned in (1) above to take place; however, since the small amount of fresh air in the engine is unable to completely scavenge a considerable quantity of residual gas, the fresh air therein would be diluted by the residual gas; since the fresh air does not flow in continuously, the cylinder would have a high ratio of residual gas after the scavenging stroke being over. Such phenomenon widely exists in two-stroke engines no matter using a conventional fuel injection method or a carburetor type whenever an engine running under a low-load condition or an idle condition. Before ignition, the residual gas ratio in the cylinder would affect the combustion efficiency of an engine. Tn case of the residual gas ratio being increased considerably, the probability of the mixture misfiring will be increased. Even if the mixture is ignited, the high ratio of residual gas would reduce the propagation speed of flame to cause a slow burning or partial misfiring condition, and that is why the two-stroke engine usually exhausts a high hydrocarbons (HC) during low-load running or idle running. Such a phenomenon is not due to the fuel short-circuiting fuel, but is a problem caused by high ratio of residual gas in cylinder. Moreover, if a car or a motorcycle is considered to drive in city according to the standard driving cycle of the automobile and motorcycle, for example the ECE cycle in Europe in air pollution regulations; the fact is that a car or motorcycle is usually running under an idle and low-load condition in most driving time, and that is the problem.

In view of the aforesaid problem, some person has developed a method of "direct-injection stratified-charge engine (or D.I.S.C. engine) to solve the unstable combustion problem of an engine under low-load running. The D.I.S.C. method is not a new idea, bat was a study for four-stroke engine about the last ten or 20 years, which may be seen in some publications of the kind. Such idea is based on to let a high amount of fresh air enter the cylinder under low-load running condition so as to scavenge the residual gas in cylinder; simultaneously, a small amount of fuel is to be injected into the cylinder to provide a low-load output. According to such a method, the load of an engine is merely related to the amount of fuel injected therein, while the air flow entered into the cylinder is maintained at a high value. The small amount of fuel injected in the cylinder would cause an over diluted condition, which is not easy to be ignited unless the stratified charge is formed around the spark plug. To obtain such a ignitable charge as desired, the injection system must provide a high pressure and late injection, and at the same time, the air flow inside the cylinder has to be controlled properly; furthermore, a high atomized and high concentrated fuel charge is also required. Unfortunately, the aforesaid requisites for obtaining the stratified charge are rather difficult to control. In the last ten or 20 years the four-stroke D.I.S.C. engine is still unable to overcome and control the aforesaid technical requirements. Although a low-load output can be obtained, the atomization and concentration of fuel spray thereof are still unable to meet the requirements desired; as a result, a high ratio of hydrocarbons in the exhaust stroke is still a problem to be overcome in a D.I.S.C. engine either a two-stroke or four-stroke one.

SUMMARY OF THE INVENTION

This invention relates to an intermittent fuel-injection method for two-stroke engine, in which an injection nozzle is mounted under a cylinder head or on a cylinder wall; the fuel can directly be injected into the cylinder to mix the air therein to form a homogeneous charge; a controller is used for controlling the injection time and the injection quantity. The controller can control the injection timing and the injection quantity in accordance with the amount of intake air and the engine rpm. Under idle running or low-load running, an intermittent fuel-injection control method is used so as to provide one, two, three, four or five cycles of scavenging and exhaust strokes after one fuel-injection cycle. The main feature of the present invention is that the problems of low combustion efficiency caused by high residual gas in the cylinder under low-load running condition can be solved by using an intermittent fuel-injection control method, whereby a stable and high combustion efficiency can be obtained.

BRIEF DESCRIPTION OF THE DRAWINGS

FIG. 1-1 is a fragmental sectional view of a cylinder head of an engine mounted with a fuel-injection nozzle according to the present invention.

FIG. 1-2 is a fragmental sectional view of an engine mounted a fuel-injection nozzle on the wall thereof according to the present invention.

FIG. 2-1 is a schematic diagram of the fuel-injection system according to the present invention.

FIG. 2-2 is a schematic diagram of a fuel-injection system designed with an compressed air supply system according to the present invention.

FIG. 3-1 is a diagram showing the relationship between HC (hydrocarbon) and the times of intermittent fuel injection under idle running of an engine according to the present invention.

FIG. 3-2 is a diagram showing the relationship among the average IMEP, the COV, and the times of intermittent fuel injection during the idle running period of an engine according to 15 the present invention.

FIG. 4-1 is a diagram showing the relationship between the times of intermittent fuel injection under low-load running and the ratio Nch of fresh air taken in of an engine according to the present invention.

FIG. 4-2 is a diagram showing the relationship between the different intermittent fuel injection times and the reducing quantity of hydrocarbons under the aforesaid different intermittent fuel injection times of an engine running under a low-load condition according to the present invention.

DETAILED DESCRIPTION

Figures 1, 2:
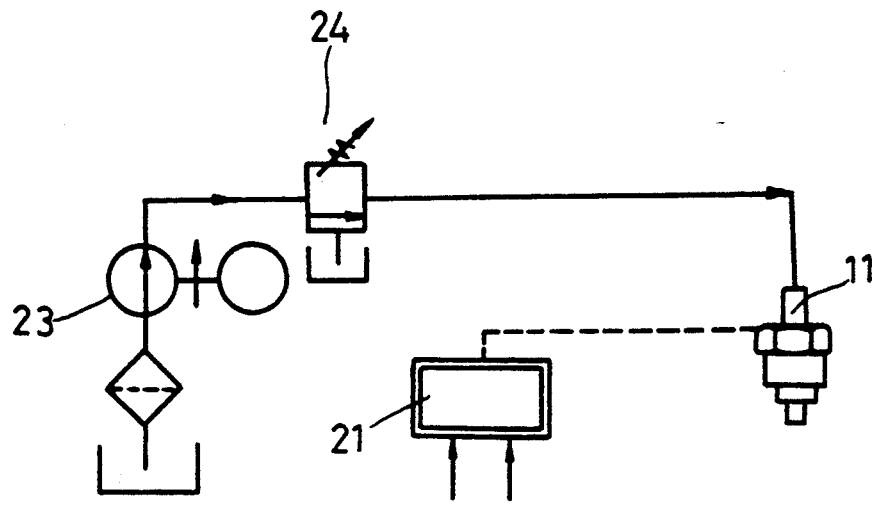
Figure 2:
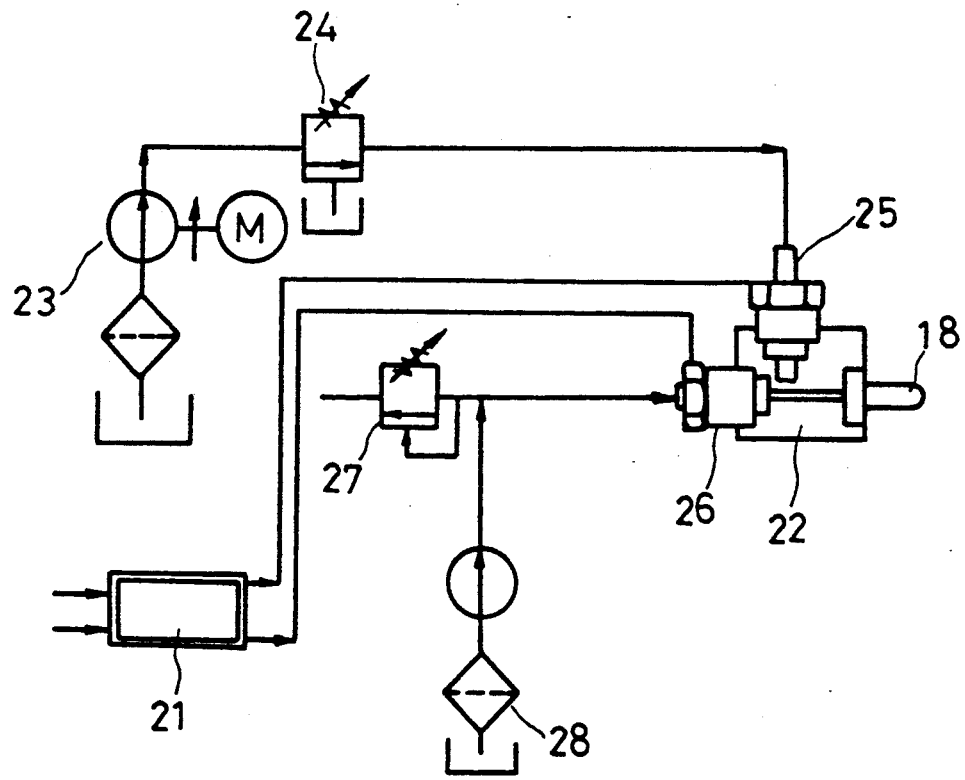

Referring to FIGS. 1-1 and 1-2, the fuel injection assemblies with injection nozzles 11 and 18 are mounted on the cylinder head 12 and the cylinder wall 13 respectively. The fuel injected inside the cylinder of an engine will be 30 mixed up with the fresh air taken in to be ignited by the spark generated with spark plug 14. The fresh air flows into the crankcase 16 and the scavenging passages 15. The fuel injection assembly may be controlled with an electronic means, i.e., the injection quantity or the injection timing 5 is to be controlled with an electronic control unit 21 (as shown in FIGS. 2-1 and 2-2). The fuel injection quantity is in direct proportion to the fresh air taken in the cylinder. For the injection timing, the factors of the short-circuiting loss of unburned mixture and the fuel-air mixing time have to be taken into consideration so as to obtain the best injection timing. If the fuel is too early to be injected into the cylinder, the fuel is susceptible to flow to the exhaust port 17 together with the fresh air if the fuel is too late to be injected into the cylinder, the fuel and the air would have insufficient time to mix with each other, i.e., to result in poor mixing quality.

Referring to FIGS. 2-1 and 2-2, the electronic control unit 21 can control the injection assembly to inject a suitable quantity of fuel at the most correct time by calculation and comparison of the data such as r.p.m. or crank angle, the throttle position or the inlet air flow, and the temperature of the various portions in the engine, which are detected with various sensors. As shown in FIG. 2-1, the injection assembly may be a solid-fuel injection type, which includes a fuel pump 23 and a fuel-pressure regulating valve 24 to provide the stable pressurized fuel supply, and a solenoid-operated fuel nozzle 11 to provide an atomized fuel.

FIG. 2-2 illustrates a compressed-air assisted fuel injection assembly, which includes a solenoid-operated fuel injection valve 25, a solenoid-operated air injection valve 26, an injection nozzle 18, and a fixture member 22. The injection procedures are that the solenoid-operated fuel injection valve 25 injects fuel into a fuel passage in the fixture member 22, and then the solenoid-operated air injection valve 26 is opened to inject compressed air at a pressure of approximate 2-6 kg/cm (depending upon the position of the injection nozzl). The compressed air is supplied by means of a small air compressor 27 and an air-pressure regulating valve 28. The fast flowing air can be used to assist the fuel atomization, and push the atomized fuel to the nozzle 18 to inject outwards. The injection system, which uses the compressed-air-assisted fuel injection assemblys, can obtain a better atomized fuel, and therefore a cylinder can be supplied with a better and homogeneous mixture.

During a low-load running of the aforesaid two-stroke engine, a poor burning-efficiency problem would exist because that the fresh air is unable to scavenge the residual gas left in the cylinder during the last combustion cycle. According to the intermittent fuel-injection method of the present invention, the feature is that the engine runs several cycles of scavenging without fuel injection under the low-load running so as to remove all the residual gas by fresh air before the fuel injection cycle being started; in that case, the fuel out of the nozzle will be mixed up homogeneously with the fresh air inside the cylinder to obtain a better combustion. Under the high-load running, the engine can have sufficient fresh air to obtain good scavenging result, i.e., it is unnecessary to use the intermittent fuel injection control means i.e., to have fuel injection at each cycle. In comparison with the continuous fuel injection, the intermittent fuel injection can provide the cylinder with several times of fresh air, and therefore the quantity fuel injection should be increased correspondingly.

According to the aforesaid controlling method, it includes two conditions, i.e., idle running which is deemed the extreme light load condition, and the other is lower load running; in such case, the engine has a given output.

The aforesaid two conditions are further described as follows:

First, set the engine in idle running, i.e., the throttle is at its lowest position; the delivery ratio d=fresh air entered in cylinder/piston displacement) can be lowered less than 0.12. Since the inlet air flow during each engine cycle (i.e., the engine moves one revolution) is very low, a single scavenging stroke is unable to remove all the residual gas in cylinder, and therefore a poor combustion will be resulted. According to the combustion pressure analysis, it is apparent that the totally misfiring and the partial misfiring cycles are over ⅔ of the total cycles; as shown in FIG. 3-1, the conventional fuel injection method (the zero intermittent times of injection) would still produce high un-burned hydrocarbon (HC).

Figures 2, 3:
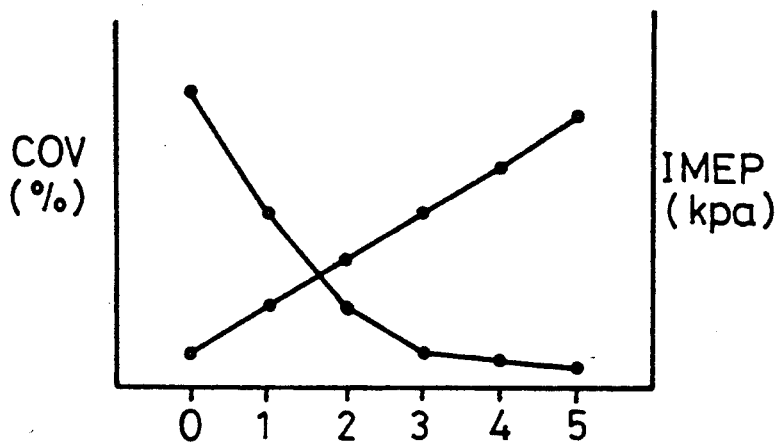
Figures 1, 3:
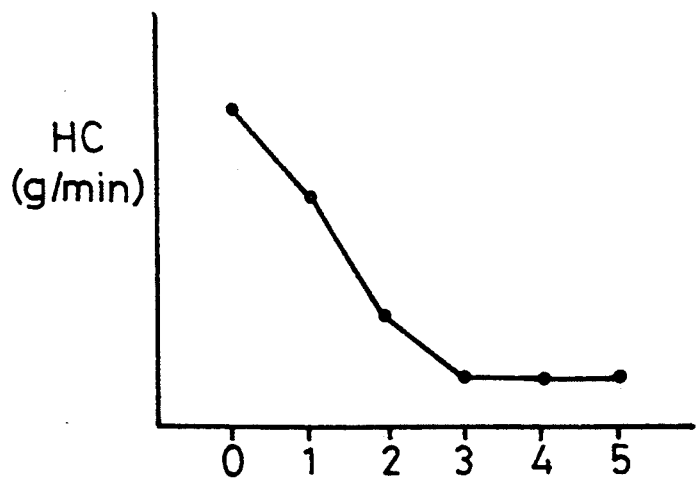

FIG. 3-2 illustrates an intermittent fuel injection (one injection every two cycles), i.e., the intermittent period is "1"; according to the combustion pressure analysis and the fuel injection cycle, a continuous and steady I.M.E.P. (kpa; Indicated Mean Effective Pressure is still not obtained. In other words, the two continuous scavenging strokes is unable to scavenge all the residual gas to produce a high combustion efficiency. As shown in FIG. 3-1, the one-intermittent times in comparison with zero-intermittent times fuel injection method only can reduce a very low ratio between the exhaust HC (g/min) and the COV (%; coefficient of Variation in IMEP, concerning only the fuel injection cycle) of IMEP.

When the intermittent times is over three (3), which include one-fuel-injection every four cycles, one fuel injection every five cycles, and one-fuel injection every six cycles, etc. According to the aforesaid fuel injection cycle examples, a continuous and steady I.M.E.P. has been shown. FIG. 3-1 illustrates the COV(%) of I.M-

.E.P. has reduced considerably, and the HC pollution has also been reduced to the lowest value; it indicates that the mixture produced out of one-fuel injection per four or more than four cycles can have a higher combustion efficiency.

In brief, an engine according to the present invention to have one-fuel injection per three, four or five cycles can effectively reduce the HC pollution, which is deemed the first feature of the present invention.

Figures 2, 4:
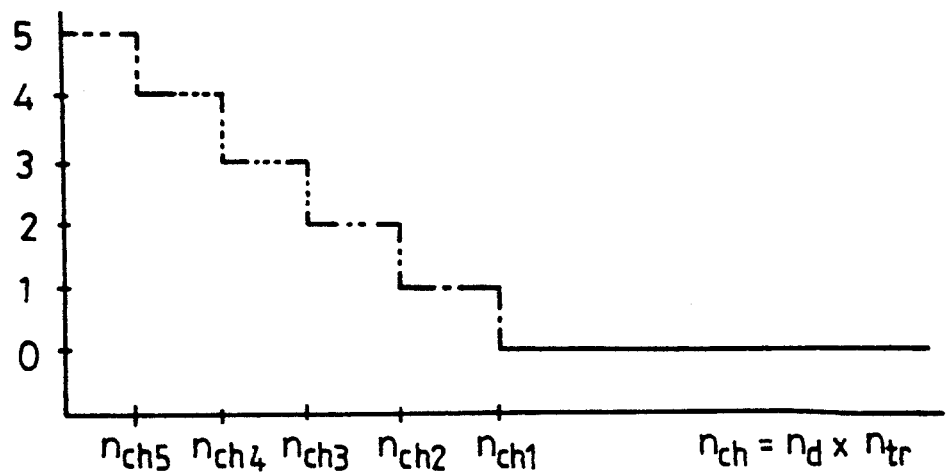
Figures 1, 4:
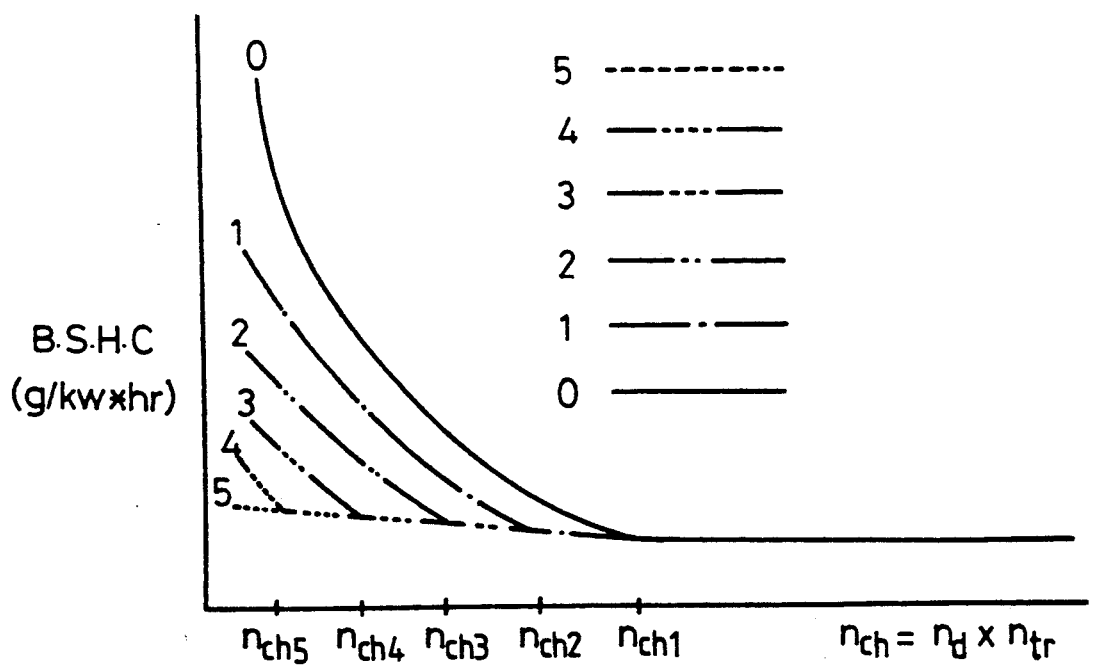

Further, an engine running under low-load condition as prescribed in accordance with a standard driving mode or under idle running would cause a higher HC pollution. In view of the aforesaid drawbacks, the features of the intermittent fuel-injection method according to the present invention are described as follows:

As shown in FIG. 4-1, the number of intermittent times under low-load running is determined by the fresh air charging ratio ($\tau ch$) in a cylinder; in a two-stroke engine, its basic characteristics are described as follows:

$$\tau ch = \tau d \times \tau tr,$$

in which $\tau ch$ stands for fresh air charging ratio
= quantity of fresh air retained in cylinder/piston displacement;

$\tau d$ stands for delivery ratio
= quantity of fresh air delivered into the cylinder/piston displacement; $\tau tr$ stand for trapping ratio
= quantity of fresh air retained in cylinder/quantity of fresh air delivered into cylinder.

The important factor which can affect $\tau ch$ (or $\tau dx$ $\tau tr$) is the opening of the throttle; a longer throttle opening can obtain a higher $\tau b$, and therefore the fresh air charging ratio $\tau ch$ will be increased. A secondary important factor which can affect the $\tau ch$ is the engine rpm; the engine rpm can also affect the $\tau tr$ and the $\tau d$. Generally, a two-stroke engine should have an engine rpm to yield a maximum $\tau ch$, the aforesaid engine rpm is related to the intake-and-exhaust tuning. When the engine is set at the lowest-load running condition, the throttle opening is slightly longer than that of the idle running condition; however, the quantity of delivered intake air is insufficient to scavenge the residual gas out of the cylinder; in that case, the method of one fuel-injection per four or more than four cycles for idle running can be used for obtaining stable and high combustion efficiency. As soon as the throttle is opened wider to have more air intake for obtaining a higher power output, the times of intermittent fuel-injection will be reduced accordingly. For example, if an engine runs at a low-load condition with one-fuel injection every six cycles that is the same as under an idle running condition, the fresh air charging ratio ($\tau ch$) will be increased to a given value ($\tau ch5$) upon the engine running one cycle, while the number of intermittently fuel-injection may be reduced to four or less than four to obtain a low-residual gas still at a high combustion efficiency. As soon as the $\tau ch$ is increased over a given value ($\tau ch4$), a three intermittent times mode may be used, i.e., one-fuel injection per four continuous scavenging mode. As soon as the $\tau ch$ increases, the times of intermittent fuel injection will be reduced. After $\tau ch$ is increased and over a given value $\tau ch 1$, the fresh air delivered into cylinder during each cycle will be sufficient to scavenge the residual gas in cylinder and to maintain a steady and high combustion efficiency, and simultaneously the intermittent fuel-injection mode will be discontinued.

The aforesaid method of determining the times of intermittent fuel injection by means of fresh air $\tau ch$ per cycle can obtain a steady and high combustion efficiency at each injection cycle at a low-load running; consequently, the method can considerably improve the conventional fuel-injection mode at each cycle; which usually causes high HC as a result of unsteady combustion under low-load running. As shown in FIG. 4-2, it is considered another feature of the present invention. Furthermore, since the fresh air $\tau ch$ at each cycle is closely related to the opening of the throttle and the engine rpm, the $\tau ch$ can be calculated and analyzed by using the signals sensed through the throttle position sensor and the engine rpm sensor, or by using the signals obtained through the inlet air flow sensor and the engine rpm sensor.

The features or technical break through of the intermittent fuel-injection method and device according to the present invention are summarized as follows:

1. In comparison with a two-stroke engine that employs the conventional fuel-injection mode at each cycle to have a homogeneous charge, the present invention is deemed able to effectively improve the irregular combustion condition of an engine caused by a high residual gas ratio under a low-load running, and the irregular combustion can produce a large quantity of HC to be exhausted in the air.

2. A comparison between the present invention and the method of conventional fuel injection at each cycle for providing a stratified mixture has been indicated that the latter method need to have a high pressure late injection system at a high cost in order to obtain a stratified charge, and has to have a sophisticated air in-cylinder flow control mechanism such as an adjustable exhaust valve so as to obtain a better fuel concentration and better atomization; otherwise, a high HC will be produced and exhausted as a result of the mixture not being ignited properly; such instance can be found in a four-stroke D.I.S.C. (direct-injection stratified-charge combustion) engine. According to the present invention, the intermittent fuel-injection method can provide a low-load output by means of a low pressure and low cost injection system to obtain a homogeneous mixture in the cylinder at each injection cycle. Further, the method according to the present invention in comparison with the homogeneous mixture of high charging ratio is deemed able to elevate the combustion efficiency and to reduce the exhaust of HC.

We claim:

1. An intermittent fuel-injection method for a two-cycle engine having an injection nozzle mounted on a cylinder head or cylinder wall for injection fuel directly into said two-cycle engine so as to have said fuel mixed with air to provide a homogeneous combustible mixture, a means for injecting air under pressure into an air inlet of the engine, a means for controlling engine speed, a fuel injection assembly for injecting a fuel quantity at a proper time, an air-inlet sensor, an engine speed sensor, and a control unit receiving signals from said sensors for developing fuel injection timing and fuel injection quantity in accordance with the following relationship:

$$\tau ch = \tau tr \, \tau dx$$

where $\tau$ch stands for fresh air charging ratio (quantity of fresh air retained in cylinder/piston displacement), $\tau$tr stands for trapping ratio (quantity of fresh air retained in cylinder/quantity of fresh air delivered into cylinder), and $\tau$dx stands for delivery ratio (quantity of fresh air delivered into the cylinder/piston displacement), the method comprising the steps of:

during idling of the engine, applying signals from the speed sensor and from the air inlet sensor to the control unit for processing, applying an output from the control unit to the fuel injection assembly to provide four or more consecutive cycles of scavenging exhaust cycles after each fuel injection, during a load condition of the engine, applying signals from the speed sensor and from the air inlet sensor to the control unit for processing, applying an output from the control unit simultaneously to the air injecting means to gradually increase the fresh air charging ratio and to the fuel injection assembly to reduce the times of intermittent fuel injection after exhaust scavenging cycles from more than four to three, two or one, further adjusting the air injecting means to gradually increase said fresh air charging ratio to reach a predetermined value, while maintaining the throttle under original opening condition, and upon reaching said predetermined value, adjusting the fuel injection assembly to feed fuel to the engine between each exhaust scavenging cycle for normal operation.

* * * * *